United States Patent
Lee

(10) Patent No.: US 9,606,385 B2
(45) Date of Patent: Mar. 28, 2017

(54) DISPLAY DEVICE

(71) Applicant: Samsung Display Co., Ltd., Yongin, Gyeonggi-Do (KR)

(72) Inventor: Seongseok Lee, Gumi-si (KR)

(73) Assignee: Samsung Display Co., Ltd. (KR)

( * ) Notice: Subject to any disclaimer, the term of this patent is extended or adjusted under 35 U.S.C. 154(b) by 73 days.

(21) Appl. No.: 14/467,663

(22) Filed: Aug. 25, 2014

(65) Prior Publication Data

US 2015/0219942 A1    Aug. 6, 2015

(30) Foreign Application Priority Data

Feb. 6, 2014  (KR) ......................... 10-2014-0013702

(51) Int. Cl.
*G02F 1/1333*   (2006.01)

(52) U.S. Cl.
CPC ............... *G02F 1/133308* (2013.01); *G02F 2001/133328* (2013.01); *G02F 2201/503* (2013.01)

(58) Field of Classification Search
CPC ... G02F 1/133308; G02F 2001/133317; G02F 2001/133328; G02F 2001/13332
See application file for complete search history.

(56) References Cited

U.S. PATENT DOCUMENTS

| | | | |
|---|---|---|---|
| 6,876,409 B2 | 4/2005 | Park et al. | |
| 8,049,832 B2 * | 11/2011 | Kim | G02F 1/133308 349/58 |
| 8,350,979 B2 | 1/2013 | Kim et al. | |
| 8,446,543 B2 | 5/2013 | Teratani | |
| 2003/0122995 A1 | 7/2003 | Park et al. | |
| 2008/0291612 A1 | 11/2008 | Kim et al. | |
| 2009/0190062 A1* | 7/2009 | Sudo | G02F 1/133308 349/58 |
| 2009/0190063 A1* | 7/2009 | Nagaoka | G02F 1/133308 349/58 |
| 2010/0149451 A1* | 6/2010 | Tanaka | G02F 1/133308 349/58 |
| 2010/0182531 A1* | 7/2010 | Teratani | G02F 1/133308 349/58 |
| 2012/0140139 A1* | 6/2012 | Zhang | G02F 1/133308 349/58 |
| 2012/0262907 A1 | 10/2012 | Lee et al. | |

(Continued)

FOREIGN PATENT DOCUMENTS

JP    2002-182209    6/2002
KR   1020050099692 A    10/2005

(Continued)

*Primary Examiner* — Phu Vu
(74) *Attorney, Agent, or Firm* — Innovation Counsel LLP

(57) ABSTRACT

A display device includes a display panel, a panel cover, and a backlight unit. The display panel is configured to display an image on a front surface thereof. The panel cover covers an edge of the display panel. The backlight unit is configured to provide a light to the display panel. The panel cover includes a first portion disposed on the front surface of the display panel, a second portion bent and extending from the first portion to face a side surface of the display panel, and a third portion bent and extending from the second portion. The third portion is disposed on a rear surface of the display panel to be substantially in parallel to the first portion.

13 Claims, 4 Drawing Sheets

(56) References Cited

U.S. PATENT DOCUMENTS

| | | | |
|---|---|---|---|
| 2013/0135553 A1* | 5/2013 | Cheng | G02F 1/133308 349/58 |
| 2014/0285747 A1* | 9/2014 | Jun | G02F 1/133308 349/58 |
| 2015/0062480 A1* | 3/2015 | Cho | G02F 1/133308 349/58 |
| 2015/0253611 A1* | 9/2015 | Yang | G02F 1/133308 349/58 |

FOREIGN PATENT DOCUMENTS

| | | |
|---|---|---|
| KR | 1020060133814 A | 12/2006 |
| KR | 1020070000876 A | 1/2007 |
| KR | 1020070036882 A | 4/2007 |

\* cited by examiner

DISPLAY DEVICE

CROSS-REFERENCE TO RELATED APPLICATION

This U.S. non-provisional patent application claims priority under 35 U.S.C. §119 of Korean Patent Application No. 10-2014-0013702, filed on Feb. 6, 2014, the contents of which are hereby incorporated by reference in its entirety.

BACKGROUND

1. Field

Embodiments of the present disclosure relate to a display device.

2. Description of the Related Art

As a flat panel display device, various display devices, such as a liquid crystal display device, a plasma display device, a field emission display device, a light emitting diode display device, an organic light emitting diode display device, etc., have been widely used.

Among them, the liquid crystal display device is applied to various fields since it has properties. e.g., development in mass production technique, easiness in driving, low power consumption, thin thickness, high-definition display quality, large-sized display screen, etc.

SUMMARY

An aspect of an embodiment of the present disclosure provides a display device having reduced thickness.

Embodiments of the inventive concept provide a display device including a display panel configured to display an image on a front surface thereof, a panel cover that covers an edge of the display panel, and a backlight unit that is configured to provide a light to the display panel. The panel cover includes a first portion, a second portion, and a third portion. The first portion is disposed on the front surface of the display panel. The second portion is bent and extends from the first portion to face a side surface of the display panel. The third portion is bent and extends from the second portion and is disposed on a rear surface of the display panel to be substantially in parallel to the first portion. The display panel includes a display area configured to display the image and a non-display area in which the image is not displayed. The first portion and the third portion overlap the non-display area. The panel cover includes a groove portion disposed between the first and third portions and formed along the first, second, and third portions.

The display panel is coupled to the panel cover after being slid along the groove portion.

The display panel may have a rectangular shape defined with long sides extending in a first direction and short sides extending in a second direction substantially perpendicular to the first direction. The display panel may include a printed circuit board provided to at least one side of the display panel and electrically connected to the display panel.

The panel cover may be disposed to correspond to sides of the display panel except for the one side at which the printed circuit board is disposed. The panel cover extends along a direction in which each of the sides of the display panel extends. The panel cover may be provided in a plural number and each of the panel covers is disposed to be spaced apart from each other. The panel cover may include a polymer resin.

The backlight unit may include a light source unit that includes a light source configured to emit the light, a bottom cover that accommodates the light source unit, and a mold frame disposed between the bottom cover and the display panel to support the display panel. The mold frame may have a rectangular ring shape corresponding to four sides of the display panel. A rear surface opposite to an upper surface of the third portion, on which the display panel is disposed, is disposed on the mold frame.

The display device further includes a fixing member disposed between the rear surface of the third portion and the mold frame.

According to an embodiment, the panel cover may be provided in a single unit and disposed to correspond to at least two sides connected to each other among the sides of the display panel.

According to the above, the display panel of the display device may be stably held by the above-mentioned structure. In addition, the display device does not include a top chassis, and thus the total thickness of the display device may be reduced.

BRIEF DESCRIPTION OF THE DRAWINGS

The above and other features of the present disclosure will become readily apparent by reference to the following detailed description when considered in conjunction with the accompanying drawings wherein.

DETAILED DESCRIPTION

Figure 1:
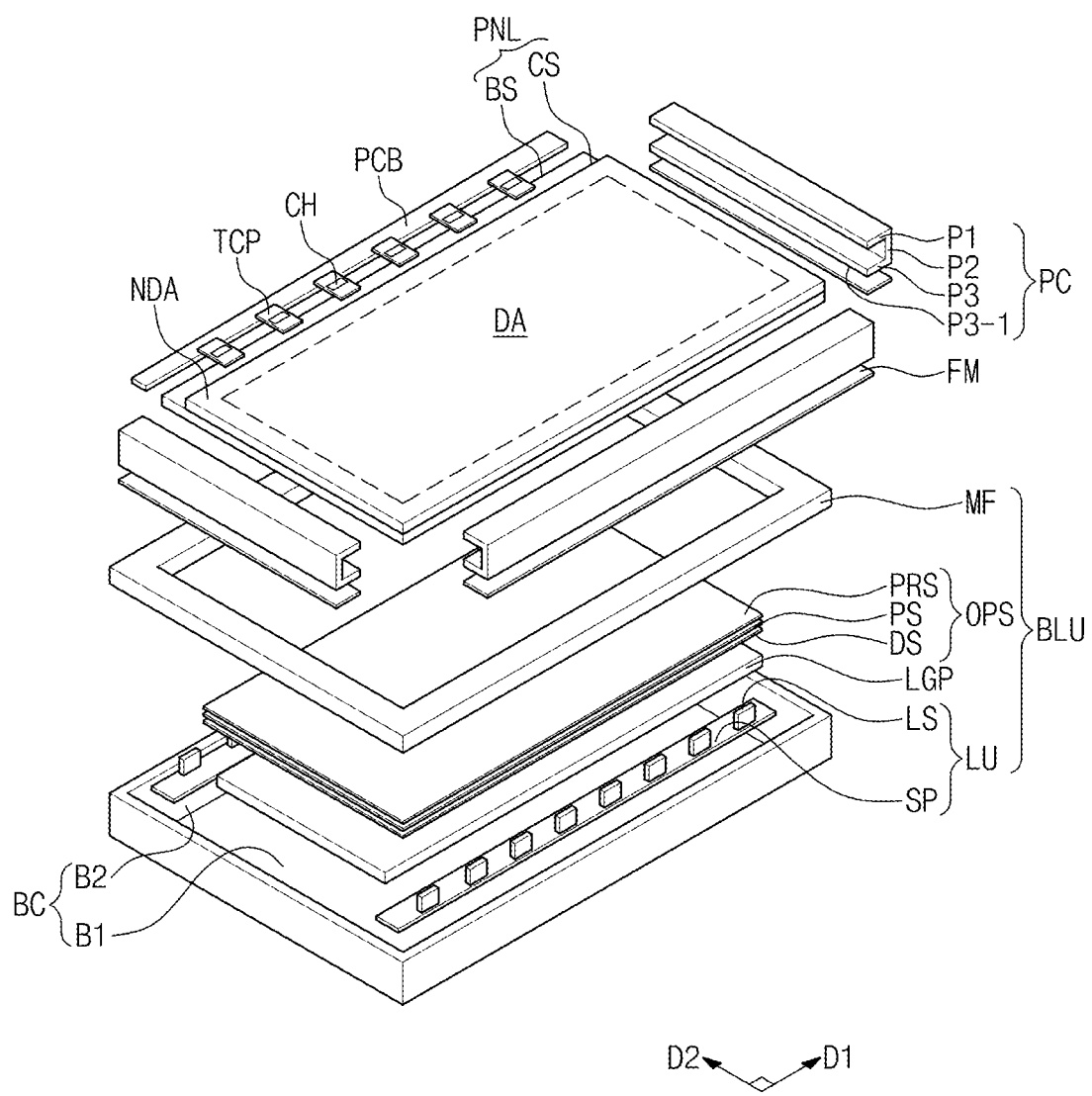
FIG. 1 is an exploded perspective view showing a display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be explained in detail with reference to the accompanying drawings.

Figure 2:
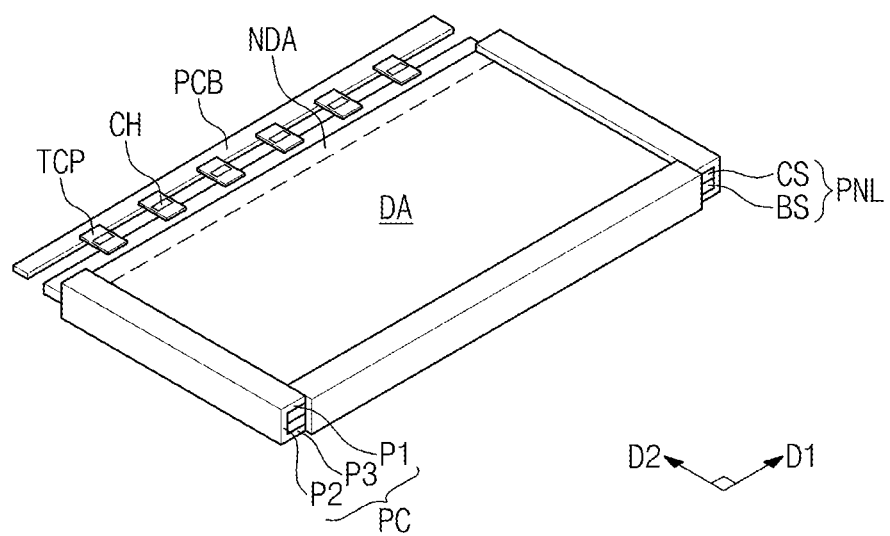
FIG. 2 is a perspective view showing a display panel and a panel frame coupled to the display panel shown in FIG. 1.

FIG. 1 is an exploded perspective view showing a display device according to an exemplary embodiment of the present disclosure and FIG. 2 is a perspective view showing a display panel and a panel frame coupled to the display panel shown in FIG. 1.

Referring to FIGS. 1 and 2, the display device includes a display panel PNL, a panel cover PC, and a backlight unit BLU.

In the present exemplary embodiment, for the convenience of explanation, a direction in which an image is displayed on the display panel PNL will be referred to as an upward direction or a front direction, and a direction opposite to the upward direction will be referred to as a downward direction or a rear direction, but they should not be limited thereto or thereby.

The display panel PNL displays the image. The display panel PNL is not-self emissive, and thus various display panels, such as a liquid crystal display panel, an electrowetting display panel, an electrophoretic display panel, a microelectromechanical system (MEMS) display panel, etc., may be used as the display panel PNL.

However, the display panel should not be limited thereto or thereby. For instance, an organic electroluminescent display panel or a plasma display panel may be used as the display panel. In this case, since the organic electroluminescent display panel or the plasma display panel is self-emissive, the backlight unit may be omitted from the display device.

In the present exemplary embodiment, the liquid crystal display panel will be described as the display panel PNL.

The display panel PNL may have a rectangular shape with a pair of long sides and a pair of short sides. Here, a direction in which the long sides of the display panel PNL extend is referred to as a first direction D1 and the short sides of the display panel PNL, extend is referred to as a second direction D2.

The display panel PNL displays the image to the front direction and includes a display area DA in which the image is displayed and a non-display area NDA disposed in an area except for the display area DA.

The display panel PNL includes a base substrate BS, an opposite substrate CS facing the base substrate BS, and a liquid crystal layer (not shown) disposed between the base substrate BS and the opposite substrate CS.

The base substrate BS includes a plurality of pixel electrodes (not shown) and a plurality of thin film transistors (not shown) electrically connected to the pixel electrodes in a one-to-one correspondence. Each thin film transistor switches a driving signal applied to the corresponding pixel electrode. In addition, the opposite substrate CS includes a common electrode (not shown) that forms an electric field in cooperation with the pixel electrodes to control an arrangement of liquid crystal molecules of the liquid crystal layer. The display panel PNL drives the liquid crystal molecules of the liquid crystal layer to allow the image to be displayed in the front direction.

The display panel PNL further includes a driving chip CH that outputs the driving signal, a tape carrier package TCP on which the driving chip CH is mounted, and a printed circuit board PCB electrically connected to the display panel PNL through the tape carrier package TCP. The printed circuit board PCB may be provided to correspond to at least one side of the display panel PNL. As shown in FIG. 1, the printed circuit board PCB is positioned at the same plane as the display panel PNL, but it should not be limited thereto or thereby. In the present exemplary embodiment, one printed circuit board PCB is provided, but the number of the printed circuit board PCB should not be limited to one. That is, the display device may include plural printed circuit boards disposed at different positions.

The printed circuit board PCB is disposed on an outer surface of a bottom cover BC described later, and in this case, the tape carrier package TCP may be bent along the outer surface of the bottom cover BC to connect the display panel PNL and the printed circuit board PCB.

The driving chip CH generates the driving signal in response to an external signal to drive the display panel PNL. The external signal is provided from the printed circuit board PCB and includes an image signal, various control signals, a driving voltage signal, etc.

The display device further includes a cover member (not shown) disposed on the printed circuit board PCB to cover the driving chip CH, the tape carrier package TCP, and the printed circuit board PCB. The cover member protects the driving chip CH, the tape carrier package TCP, and the printed circuit board PCB.

The display device includes a panel cover PC to cover an edge of the display panel PNL. The panel cover PC is disposed to correspond to sides of the display panel PNL except for the area in which the printed circuit board PCB is disposed.

The panel cover PC includes a first portion P1 disposed on a front surface of the display panel PNL, a second portion P2 bent and extending from the first portion P1 to face a side surface of the first portion P1, and a third portion P3 bent and extending from the second portion P2, the third portion P3 being disposed on a rear surface of the display panel PNL to be substantially in parallel to the first portion P1. The first and third portions P1 and P3 are overlapped with the non-display area NDA of the display panel PNL.

The panel cover PC extends in one direction corresponding to a direction in which a corresponding side in the sides of the display panel PNL extends.

The panel cover PC may be provided in a plural number and the panel covers PC may be disposed to be spaced apart from each other. The panel cover PC includes an organic material, e.g., a polymer resin. Since the polymer resin has a predetermined elasticity, the panel cover PC is advantageous to minimize external impacts. However, the panel cover PC should not be limited to the polymer resin as long as the panel cover PC has the same shape and function.

The backlight unit BLU is disposed under the display panel PNL to provide a light to the display panel PNL. The backlight unit BLU includes a light source unit LU including light sources LS to emit the light, the bottom cover BC to accommodate the light source unit LU, a mold frame MF disposed between the bottom cover BC and the display panel PNL to support the display panel PNL.

The backlight unit BLU further includes a light guide plate LGP to guide the light to the display panel PNL and at least one optical sheet OPS to improve an efficiency of the light.

The light source unit LU includes the light sources LS and a support part SP to support the light source LS. The support part SP may be a printed circuit board, on which wires that apply and control a source voltage to the light sources LS are printed, and have a rectangular plate shape extending in one direction. The light source unit LU may be provided in a plural number.

The light source unit LU is disposed to be adjacent to the light guide plate LGP. The light emitted from the light sources LS is incident to the light guide plate LGP. The light guide plate LGP is accommodated in the bottom cover BC and guides the light provided from the light sources LS to the display panel PNL.

The light source unit LU may be provided to correspond to at least one side of the display panel PNL. In the present exemplary embodiment, two light source units LU are disposed along the long sides of the display panel PNL and spaced apart from each other in the second direction D2.

Each light source LS may be, but not limited to, a point light source, a line light source, or a surface light source. As an example, the point light source, e.g., a light emitting diode, will be described as the light source LS. The light emitting diode is provided in a plural number and the light emitting diodes are arranged in a line on the support part SP. Here, the light source means a minimum light emitting unit, which is able to individually control an amount of the light emitted therefrom. Thus, one light source is configured to include one light emitting diode or plural light emitting diodes of which the brightness of the light emitting diodes is substantially simultaneously controlled. In the present exemplary embodiment, the light source unit LU includes the support part SP and the light sources LS, but it should not be limited thereto or thereby. That is, the support part SP may be omitted. In this case, a separate supporting member to support the light sources LS and/or a separate wirings to apply the source voltage to the light sources are prepared.

The support part SP may include a light source controller (not shown) connected to the light source LS. The light source controller analyzes the image displayed on the display panel PNL to output a local dimming signal and to individually control a brightness of each light source LS in response to the local dimming signal. The light source controller may be mounted on a separate circuit board, but the position of the light source controller should not be limited to the separate circuit board.

The optical sheet OPS is disposed between the light guide plate LGP and the display panel PNL to control the light emitted from the light source LS. The optical sheet OPS may include a diffusion sheet DS, a prism sheet PS, and a protective sheet PRS.

The diffusion sheet DS diffuses the light. The prism sheet PS condenses the light diffused by the diffusion sheet DS to allow the light exiting from the diffusion sheet DS to travel in a direction substantially vertical to the display panel PNL. The light exiting from the prism sheet PS is vertically incident into the display panel PNL. The protective sheet PRS is disposed on the prism sheet PS to protect the prism sheet PS from external impacts. In the present exemplary embodiment, the optical sheets OPS are configured to include one diffusion sheet DS, one prism sheet PS, and one protective sheet PRS, but they should not be limited thereto or thereby. That is, at least one of the diffusion sheet DS, the prism sheet PS, and the protective sheet PRS of the optical sheets OPS may be provided in plural number, or one or more of the diffusion sheet DS, the prism sheet PS, and the protective sheet PRS may be omitted from the optical sheets OPS. In addition, the stack order of the diffusion sheet DS, the prism sheet PS, and the protective sheet PRS may be changed.

The backlight unit BLU may further include a reflection member (not shown) to reflect the light to the display panel PNL.

The bottom cover BC includes a bottom surface B1 facing the rear surface of the display panel PNL and a sidewall portion B2 extending upward from the bottom surface B1. The light source unit LU is disposed on the bottom surface B1 of the bottom cover BC.

The mold frame MF is disposed under the display panel PNL to support the display panel PNL. In addition, the mold frame MF supports the optical sheets OPS.

The mold frame MF includes a fixing member (not shown), e.g., a stopping part, to fix or support the display panel PNL, the optical sheets OPS, or portions of the light source units LU. The mold frame MF may be provided to correspond to four sides or a portion of the four sides of the display panel PNL. For instance, the mold frame MF may have a rectangular ring shape corresponding to four sides of the display panel PNL or a laid-U shape to correspond to three sides of the display panel PNL. The mold frame MF may be integrally formed as a single unitary and individual unit or formed in plural parts. The mold frame MF includes an organic material, e.g., a polymer resin, but it should not be limited thereto or thereby.

The mold frame MF may further include a hanger (not shown) to engage with the bottom cover BC. The mold frame MF is coupled to the bottom cover BC at the rear portion of the bottom surface B1 or the outer portion of the sidewall portion B2. Although not shown in figures, the bottom cover BC may further include an engaging portion (not shown) engaged with the hanger of the mold frame MF. The hanger is formed in a portion of an edge of the mold frame MF, but the mold frame MF is provided on the sidewall portion B2 of the bottom cover BC and coupled to the bottom cover BC.

The panel cover PC is disposed on the mold frame MF. A rear surface P3-1 opposite to the upper surface of the third portion P3, on which the display panel PNL is disposed, is placed on the mold frame MF. The display device may further include a fixing member FM disposed between the mold frame MF and the rear surface P3-1 of the third portion P3 to hold the mold frame MF and the panel cover PC. The fixing member FM may be an adhesive, but it should not be limited to the adhesive. That is, the fixing member FM may be a screw as long as the fixing member FM holds the panel cover PC and the mold frame MF.

According to another embodiment, the light guide plate LGP may be omitted from the backlight unit BLU. In this case, the light source units may be disposed to overlap with the display area of the display panel when viewed in a plan view. In more detail, the backlight unit BLU according to the present exemplary embodiment is an edge-illumination type backlight unit BLU in which the light source units LU are disposed at a side portion of a rear of the display panel PNL to be adjacent to a side of the display panel PNL. However, the backlight unit according to another embodiment may be a direct-illumination type backlight unit in which the light source units are disposes over the entire surface of the rear of the display panel. The light source units are spaced apart from each other at regular intervals. In addition, a diffusion part may be further disposed between the display panel and the light source units to diffuse the light.

Figure 3:
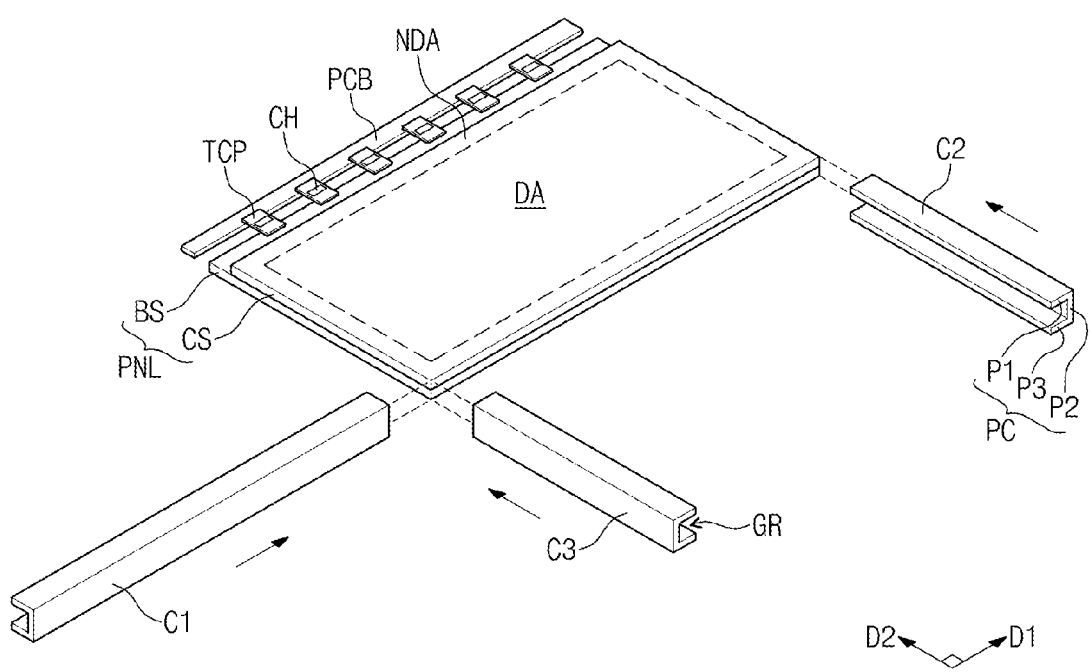
FIG. 3 is a perspective view showing an assembling method of a display device according to an exemplary embodiment of the present disclosure.

FIG. 3 is a perspective view showing an assembling method of a display device according to an exemplary embodiment of the present disclosure. Hereinafter, the process of coupling the panel cover PC to the display panel PNL will be described with reference to FIG.

Referring to FIG. 3, the display panel PNL may include the printed circuit board PCB disposed to correspond to one long side of the display panel PNL.

The panel cover PC is provided to correspond to the three sides of the display panel PNL except for the side at which the printed circuit board PCB is disposed.

The panel cover PC includes a first cover C1 corresponding to the one long side of the display panel PNL and extending in the first direction D1, and second and third covers C2 and C3 respectively corresponding to the short sides of the display panel PNL and extending in the second direction D2.

The panel cover PC includes the first portion P1 disposed on the front surface of the display panel PNL, the second portion P2 bent and extending from the first portion P1 to face the side surface of the first portion P1, and the third portion P3 bent and extending from the second portion P2 and disposed on the rear surface of the display panel PNL to be substantially in parallel to the first portion P1.

The panel cover PC includes a groove portion GR disposed between the first and third portions P1 and P3 and formed along the first, second, and third portions P1, P2, and P3. The display panel PNL is slid along the groove portion GR and inserted into between the first and third portions P1 and P3, and thus the panel cover PC is coupled to the display panel PNL.

The first cover C1 is slid in the first direction D1 along the one long side of the display panel PNL and coupled to the display panel PNL.

The second and third covers C2 and C3 are slid in the second direction D2 along the short sides of the display panel PNL and coupled to the display panel PNL. As a result, the display panel PNL is placed between the first, second, and third portions P1, P2, and P3 and stably fixed to the panel cover PC.

Figure 4:
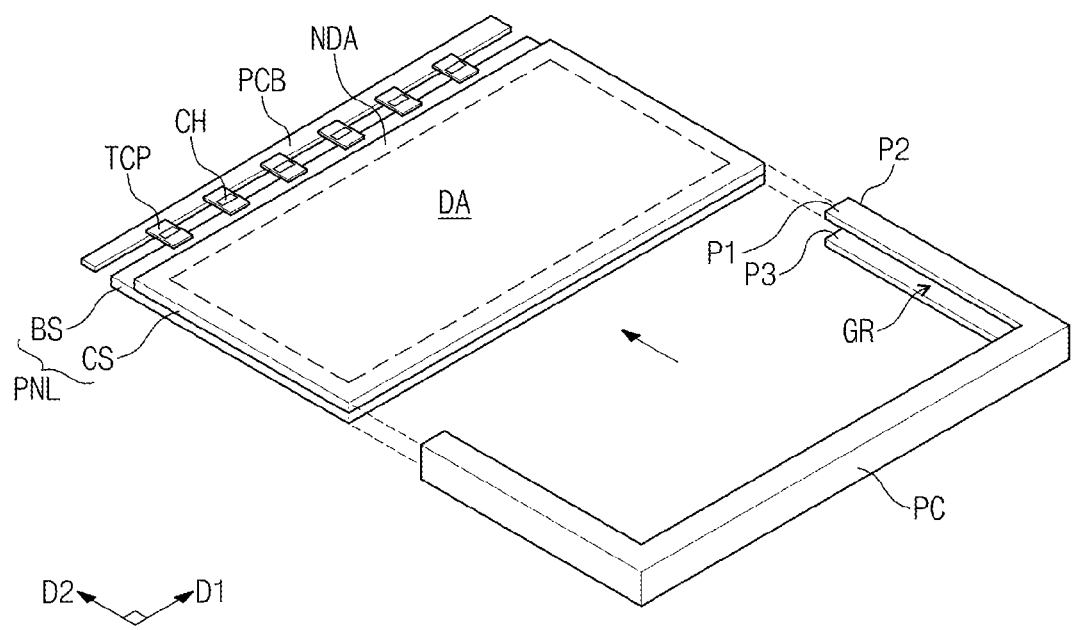
FIG. 4 is a perspective view showing an assembling method of a display device according to another exemplary embodiment of the present disclosure.

FIG. 4 is a perspective view showing an assembling method of a display device according to another exemplary embodiment of the present disclosure.

Referring to FIG. 4, the panel cover PC is provided in a single unit and corresponds to at least two sides connected to each other of the sides of the display panel PNL. The panel cover PC is bent at least one time. In FIG. 4, the display panel PNL includes the printed circuit board PCB provided at one long side of the sides of the display panel PNL.

The panel cover PC has the laid-U shape to correspond to three sides of the display panel PNL except for the side at which the printed circuit board PCB is provided.

The panel cover PC includes the first portion P1 disposed on the front surface of the display panel PNL, the second portion P2 bent and extending from the first portion P1 to face the side surface of the first portion P1, and the third portion P3 bent and extending from the second portion P2 and disposed on the rear surface of the display panel PNL to be substantially in parallel to the first portion P1.

The panel cover PC includes a groove portion GR disposed between the first and third portions P1 and P3 and formed along the first, second, and third portions P1, P2, and P3.

The display panel PNL is slid into the groove portion GR through an opening of the panel cover PC. Accordingly, the display panel PNL is coupled to the panel cover PC. The display panel PNL is slid along a direction substantially in parallel to two sides of the panel cover PC, which face each other, and coupled to the panel cover PC. As a result, the display panel PNL is placed between the first, second, and third portions P1, P2, and P3 and stably fixed to the panel cover PC.

According to a conventional display device, a display panel is fixed using a fixing member, e.g., a tape, instead of a top chassis. In this case, a difference in adhesive force of the tape occurs depending on a surface flatness of the display panel, so that stress is partially applied to the display panel. However, since the display panel according to the present exemplary embodiment is stably coupled to the panel cover, the stress applied to the display panel may be minimized. Therefore, light leakage of the display panel may be improved.

In addition, the display panel is coupled to the panel cover formed of the polymer resin, and thus the display panel may be prevented from being damaged.

Further, since the top chassis is omitted from the display device, a total thickness of the display device may be reduced, and the display device, which is slim and lightweight, may be manufactured.

Although the exemplary embodiments have been described, it is understood that the inventive concept should not be limited to these exemplary embodiments but various changes and modifications can be made by one ordinary skilled in the art within the spirit and scope of the inventive concept as hereinafter claimed.

What is claimed is:
1. A display device comprising:
a display panel configured to display an image on a front surface thereof;
a panel cover that covers an edge of the display panel;
a backlight unit configured to provide a light to the display panel, the panel cover comprising:
a first portion on the front surface of the display panel;
a second portion bent and extending from the first portion to face a side surface of the display panel; and
a third portion bent and extending from the second portion, the third portion being disposed on a rear surface of the display panel to be substantially in parallel to the first portion, wherein the backlight unit comprises:
a light source unit that includes a light source configured to emit the light;

a bottom cover that accommodates the light source unit; and a mold frame disposed between the bottom cover and the display panel to support the display panel, wherein a rear surface opposite to an upper surface of the third portion, on which the display panel is disposed, is disposed on the mold frame, the third portion being located between the display panel and the mold frame; and a fixing member disposed between the rear surface of the third portion and the mold frame to hold the mold frame to the panel cover.

2. The display device of claim 1, wherein the display panel has a rectangular shape defined with long sides extending in a first direction and short sides extending in a second direction substantially perpendicular to the first direction.

3. The display device of claim 2, wherein the display panel comprises a printed circuit board provided to at least one side of the display panel and electrically connected to the display panel.

4. The display device of claim 3, wherein the panel cover is disposed to correspond to sides of the display panel except for the one side at which the printed circuit board is disposed.

5. The display device of claim 4, wherein the panel cover extends along a direction in which each of the sides of the display panel extends.

6. The display device of claim 5, wherein the panel cover is provided in a plural number and each of the panel covers is disposed to be spaced apart from each other.

7. The display device of claim 4, wherein the panel cover is provided in a single unit and disposed to correspond to at least two sides connected to each other among the sides of the display panel.

8. The display device of claim 7, wherein the panel cover comprises a polymer resin.

9. The display device of claim 1, wherein the mold frame has a rectangular ring shape corresponding to four sides of the display panel.

10. The display device of claim 1, wherein the display panel comprises a display area configured to display the image and a non-display area in which the image is not displayed, and the first portion and the third portion overlap the non-display area.

11. The display device of claim 1, wherein the panel cover comprises a groove portion disposed between the first and third portions and formed along the first, second, and third portions.

12. The display device of claim 11, wherein the display panel is coupled to the panel cover after being slid along the groove portion.

13. The display device of claim 1 wherein the fixing member comprises an adhesive adhering the rear surface of the third portion to the mold frame.

* * * * *